(12) United States Patent
Haumont

(10) Patent No.: US 6,633,755 B1
(45) Date of Patent: Oct. 14, 2003

(54) METHOD AND NODES FOR ROUTING A CALL IN A MOBILE TELECOMMUNICATION NETWORK

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/544,667

(22) Filed: Apr. 6, 2000

Related U.S. Application Data

(63) Continuation of application No. PCT/FI98/00805, filed on Oct. 15, 1998.

(30) Foreign Application Priority Data

Oct. 17, 1997 (FI) .................................................. 973996

(51) Int. Cl.$^7$ ......................... G01R 31/08; H04M 11/00
(52) U.S. Cl. ..................... 455/406; 455/428; 455/445; 370/238
(58) Field of Search .............................. 455/428, 406, 455/407, 414, 432, 433, 435, 445, 461, 422, 560, 432.1; 370/216, 238, 238.1, 237

(56) References Cited

FOREIGN PATENT DOCUMENTS

| | | |
|---|---|---|
| EP | 0 674 460 | 9/1995 |
| FI | 101183 B | 2/1997 |
| FI | 101119 B | 5/1997 |
| WO | 96/20574 | 7/1996 |
| WO | 97/08912 | 3/1997 |
| WO | 97/41668 | 11/1997 |

OTHER PUBLICATIONS

"Digital cellular telecommunications system; Closed User Group (CUG) Supplementary Services—Stage 1", GSM Technical Specification GSM 02.85; European Telecommunications Standards Institute Version 5.0.0.

"NOM—A Tool for optimal Design and Performance Evaluation of routing Strategies and its Application to the Telenet Network" Gersht, et al. IEEE Infocom '88; New Orleans, Mar. 27–28 1998, No. 1988, Institute of Electronics Engineers, pp. 585–592.

Primary Examiner—Dwayne Bost
Assistant Examiner—Sheila Smith
(74) Attorney, Agent, or Firm—Squire, Sanders & Dempsey L.L.P.

(57) ABSTRACT

The advantages of optimal routing are somewhat limited by the tariff requirements requiring that optimal routing must not cause the call to be more expensive to any of the subscribers participating in the call. If the bills of both the calling and the called subscriber are paid by the same company, for example, it is in the interest of the company to minimize the total cost of the call, i.e. the sum of the bills of subscribers A and B. In this invention a condition for bypassing the tariff requirement for direct routing is specified. The calls can be routed directly, for example, within a prespecified user group.

25 Claims, 9 Drawing Sheets

| IMSI | BSGC | CUG INDEX LIST | DEFAULT CUG INDEX | OA | IA |
|---|---|---|---|---|---|
| | T11 | 1;2 | 1 | T | T |
| | T62 | 1 | 1 | T | T |

| CUG INDEX | CUG IC | ICB | OCB |
|---|---|---|---|
| 1 | 101 | F | F |
| 2 | 12 | F | F |

| IMSI | BSGC | CUG INDEX LIST | DEFAULT CUG INDEX | OA | IA |
|---|---|---|---|---|---|
| | T11 | 1;2 | 1 | T | T |
| | T62 | 1 | 1 | T | T |

| CUG INDEX | CUG IC | ICB | OCB | DRF |
|---|---|---|---|---|
| 1 | 101 | F | F | T |
| 2 | 12 | F | F | T |

| IMSI | BSGC | CUG INDEX LIST | DEFAULT CUG INDEX | OA | IA | SDRF |
|------|------|----------------|-------------------|----|----|------|
|      | T11  | 1;3;4          | 1                 | T  | T  | T    |
|      | T62  | 1;3;4          | 1                 | T  | T  | F    |

| CUG INDEX | CUG IC | ICB | OCB | DRF |
|-----------|--------|-----|-----|-----|
| 1         | 101    | F   | F   | T   |
| 2         | 12     | F   | F   | T   |

| MSISDN(B) |
|---|
| DISCRIMINATOR |
| SDTR |

| IMSI | BSGC | CUG INDEX LIST | DEFAULT CUG INDEX | OA | IA | SDRF | SDIRF |
|---|---|---|---|---|---|---|---|
| | T11 | 1;3;4 | 1 | T | T | T | T |
| | T62 | 1;3;4 | 1 | T | T | F | F |

| CUG INDEX | CUG IC | ICB | OCB | DRF |
|---|---|---|---|---|
| 1 | 101 | F | F | T |
| 2 | 12 | F | F | T |

| IMSI | BSGC | CUG INDEX LIST | DEFAULT CUG INDEX | OA | IA | SDRF |
|---|---|---|---|---|---|---|
| | T11 | 1;3;4 | 1 | T | T | T |
| | T62 | 1;3;4 | 1 | T | T | F |

| CUG INDEX | CUG IC | ICB | OCB | DRF | DRICF |
|---|---|---|---|---|---|
| 1 | 101 | F | F | T | T |
| 2 | 12 | F | F | T | F |

METHOD AND NODES FOR ROUTING A CALL IN A MOBILE TELECOMMUNICATION NETWORK

This is a continuation of PCT/FI98/00805, filed Oct. 15, 1998.

FIELD OF THE INVENTION

This invention concerns the routing of calls in a mobile telecommunication system.

BACKGROUND OF THE INVENTION

Network elements relating to a known mobile telecommunications network and the connections between the network elements are presented in FIG. 1. The network used as an example in this application is according to the GSM standard. In the context of this application, the word network corresponds to a mobile telecommunication network operated by one operator. The solid lines in the figure illustrate connections comprising both signaling and traffic connections. The dashed lines correspond to pure signaling connections.

The network comprises Mobile Stations MS, Base Transceiver Stations (BTS1–BTS6), Base Station Controllers (BSC1, BSC2) and Mobile Switching Stations (MSCA, MSCB). The mobile switching stations are connected to their corresponding Visitor Locations Registers VLR. Additionally, the network comprises Home Location Registers HLR, and a Network Management System NMS.

The mobile stations MS are capable of establishing connections with the base stations BTS. A plurality of base transceiver stations are controlled by a base station controller BSC. Correspondingly, a plurality of base station controllers are controlled by a mobile switching center MSC. As an example, the connections established by the mobile station MS shown in the figure are routed from the base station BTS4 via the base station controller BSC2 to the mobile switching center MSCA. Depending on the location of the called subscriber, MSCA switches the calls back to base station controllers BSC1 or BSC2 controlled by MSCA, to other mobile switching centers such as MSCB or to other telecommunication networks such as the PSTN (Public Switched Telephone Network) or the ISDN (Integrated services Digital Network).

One feature characteristic of mobile telecommunication networks is that the geographical location of the mobile stations can change. Due to this, the network has to maintain information about the location of the mobile subscribers. In the network shown in FIG. 1, this information is distributed between the home location register HLR and the visitor location registers VLR being directly connected to mobile switching centers MSC. The HLR is in the home network of the mobile subscriber and contains the unchanging subscriber information and the location information of the mobile subscriber with an accuracy of one VLR area. The VLR area typically equals the area served by one mobile switching center. The VLR of the visited mobile switching center VMSC responsible for the area the subscriber is visiting at the time contains more exact information of the subscriber's location.

The network management system NMS is used to collect information concerning the traffic situation of the network, for example, and to load configuration information and programs to other network elements.

The routing of a call to mobile subscriber B is shown in FIG. 2. In the figure, the network PLMNA (PLMN=Public Land Mobile Network) of the calling subscriber A, the home network HPLMNB of the called subscriber B, and the network VPLMNB visited by the called subscriber are shown. With PLMNA, HPLMNB and VPLMNB

- all can be operated by the same operator (interoperator call),
- two of them can be operated by the same operator and the third one by another operator, or
- all can be operated by different operators.

In FIG. 2, the calling subscriber A is also a mobile subscriber. If the calling subscriber is a fixed network subscriber, the routing is almost completely alike, except that the gateway MSC GMSCA of subscriber A is replaced by a fixed network gateway exchange.

The signaling needed for establishing the call is presented in FIG. 3. The solid lines in the figure illustrate circuit switched connections comprising both signaling and user data traffic. The dashed lines correspond to packet switched signaling connections. First, a connection between the calling subscriber A and his exchange VMSCA is established, and the call routed to a gateway exchange GMSCA of the network. Second, GMSCA analyzes the MSISDN number MSISDN(B) of the called subscriber B, and contacts the gateway MSC GMSCB of B using the message IAM (Initial Address Message). In response to this message, GMSCB asks the home location register HLRB of subscriber B for the necessary routing information by sending the message SRI (Send Routing Information). Having received the message, HLRB checks the subscription information to find out the VLR address of the called subscriber and to see whether the call should be barred or transferred to a third party. If the call is to be connected to subscriber B, HLRB sends the current visitor location register VLRB of subscriber B the message PRN (Provide Roaming Number). In response VLRB returns a roaming number MSRN (Mobile Subscriber Roaming Number) identifying the called subscriber in this VLR. VLRB returns to HLRB the MSRN of subscriber B in message PRN ACK (PRN Acknowledgment), and HLRB forwards it to GMSCB in the message SRI ACK. Using the received identification MSRN and the message IAM(MSRN), GMSCB establishes a connection to the MSC VMSCB currently visited by subscriber B. To identify the called subscriber of the roaming number with his identity number IMSI VMSCB queries VLRB, and VLRB returns this information. According to the specifications, this is done using messages SIIC (Send Info for Incoming Call) and CC (Complete Call). Having the identity of the called subscriber, VMSCB now establishes the final leg of the call to the called subscriber using the message SETUP.

In GSM, the basic principle in charging is that the calling subscriber pays the leg between himself and the home network HPLMNB of the called subscriber. The rest of the route is paid by the called subscriber. The idea here is that the calling subscriber shall not have to pay a surprisingly high price for her call, e.g., when the called subscriber is roaming in a distant country. According to this principle, when the A subscriber in Finland calls a mobile subscriber whose home network is in New Zealand but who is currently roaming in Finland, subscriber A pays the leg from Finland to New Zealand and subscriber B the leg from New Zealand back to Finland.

ETSI (European Telecommunications Standards Institute) is specifying into the GSM system the method of optimal routing to be used as an alternative for the above described normal call routing. The basic idea of the optimal routing method, shown in FIG. 4, is to route the call using the most direct route between subscribers A and B. Instead of immediately establishing a connection to the gateway MSC GMSCB of the home network of the called subscriber, the gateway MSC GMSCA of the calling subscriber sends the home location register HLRB of the called subscriber the request SRI for routing information. HLRB asks the VLRB for a roaming number, and forwards the routing number to GMSCA. Using the roaming number, GMSCA establishes a connection directly to VMSCB visited by the called subscriber. Thus, the call is not necessarily routed through the home network of subscriber B, but the home network is only contacted in the HLR inquiry. Using optimal routing, the interexchange call expenses and thus the total call price can be reduced.

MoU (Memorandum of Understanding), an organization of the GSM operators, has specified two conditions to be met by the implementation of optimal routing:

1. using the optimal routing may not increase the call price for any subscriber (tariff requirement), and
2. at least in the first phase of the service, one call leg is always paid by one subscriber.

Because the expenses caused by different legs can not be assumed to be known in the first phase of optimal routing, the optimal routing is used in the first phase only if both GMSCA and VMSCB or both VMSCB and HLRB are in the same country. In this case, the price of the call for at least for one of the subscribers does not exceed the maximum of a national call to a mobile subscriber.

The aim of optimal routing is to route the call as directly as possible. Thus, the HLR inquiry giving information about the location of the called subscriber must be done as early as possible in the establishment procedure of the call. If the calling subscriber belongs to the same mobile telecommunications system as the called subscriber, the inquiry can be made by the gateway MSC GMSCA of subscriber A. If the calling subscriber does not belong to the same system, the call can be routed to a network element capable of doing HLR inquiries according a prespecified prefix number, for example.

Let us now study the establishment of an optimally routed call with reference to FIG. 5, which shows the signaling used in the establishment procedure. The call is first routed to an interrogating network IPLMN (Interrogating PLMN) capable of interrogating the HLR. VMSCA receives the request SETUP to establish a call specifying the MSISDN identity of the called subscriber. This request is forwarded to a gateway exchange GMSCA. If GMSCA supports optimal routing (OR1=Y, Yes), it sends the home location register HLRB of the called subscriber an HLR inquiry SRI(B, OR) identifying the called subscriber B and the request for optimal routing OR. If HLRB supports optimal routing (OR2=Y), it checks whether the tariff requirement for optimal routing is met. This requirement is that:

the directly routed call is cheaper than the leg between subscriber A and HPLMNB or the directly routed call is cheaper than the leg between HPLMNB and subscriber B.

If at least one of these requirements is met (OR3=Y) and there are no other obstacles for establishing the call, HLRB sends the current VLR VLRB of the called subscriber a request PRN for a roaming number.

If VLRB supports optimal routing (OR4=Y), it returns the roaming number MSRN in the message PRN ACK, and HLRB relays it to GMSCB in the message SRI ACK. GMSCA then establishes a connection to VMSCB directly using the received MSRN in message IAM.

If at least one of the conditions OR2, OR3 or OR4 are not met, HLRB returns to GMSCA an error message SRI ERROR. When GMSCA receives this message or when it does not support optimal routing, it continues the call establishment using the normal routing procedure shown in FIG. 3.

The advantages of optimal routing are somewhat limited by the tariff requirements stipulating that optimal routing must not cause the call to be more expensive to any of the subscribers participating in the call. Let us consider a situation where the bills of both the calling and the called subscriber are paid by the same company. It is in the interest of the company to minimize the total cost of the call, i.e. the sum of the bills of subscribers A and B. Let us study a situation where A calls from France to B, whose home network is in Finland but who is roaming in China. The direct route from France to China is, nevertheless, more expensive than either of the individual legs, i.e. more expensive than the leg from France to Finland and more expensive than the leg from Finland to China. Therefore, to comply with the tariff requirements stipulating that the directly routed call may not become more expensive than the normally routed call to any subscriber, the normal routing is selected. However, for the company paying the bill, the optimal solution would be to route the call directly and thus minimize the total cost.

The objective of this invention is to solve the above-mentioned problem of the prior art. This objective is achieved using the method and apparatus specified in the independent claims.

SUMMARY OF THE INVENTION

The basic idea of this invention is to specify a condition for routing the call directly which is independent of the tariff requirement for direct routing.

According to one embodiment, the calls within a pre-specified user group are always routed directly. The invention can be implemented, e.g., by adding to the closed user group information of the subscriber a direct routing flag indicating that the calls within the closed user group are to be routed directly. The decision to route the call directly can then be made on the basis of the closed user group checks and the value of the direct routing flag of the calling subscriber.

According to another embodiment, the calling subscriber can specify that his calls are always to be routed directly. This information is added into the subscriber information preferably at the visitor location register of the subscriber.

In still another embodiment, the call is specify to be routed directly on a call per call basis. This can be achieved by adding to the call information a flag indicating that this call is to be routed directly.

BRIEF DESCRIPTION OF THE FIGURES

The invention is described more closely with reference to the accompanying schematic drawings, in which.

DETAILED DESCRIPTION OF THE INVENTION

In the invention, it can be determined the tariff requirement for optimal routing is to be bypassed. The call can thus be routed directly even if the legs in the normally routed call are separately cheaper than the directly routed call.

The order to bypass the tariff requirement can be specified in various ways. The first possible implementation to be presented here is the usage of closed user groups.

In telecommunication systems one known method is to specify Closed User Groups CUG formed, for example, by the employees of a company or members of a family. An example of such an arrangement is described in specification GSM 02.85 published by the European Telecommunications Standards Institute ETSI. According to the specification, a subscriber belonging to a closed user group can be given different subscriber options, for specifying what kind of calls the subscriber can make and receive.

Figures 6, 7, 8:
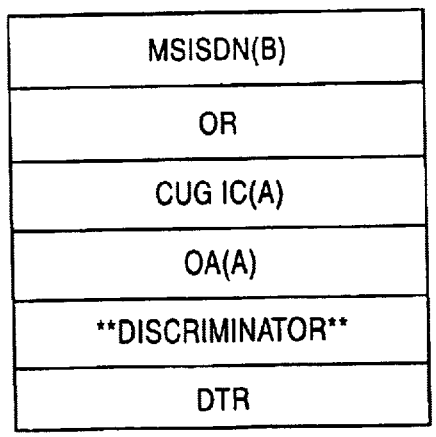
FIG. 6 shows a record storing the closed user group information of a subscriber.
FIG. 7 shows record storing subscriber information.
FIG. 8 shows the structure of a message.

The storing of closed user group information in the subscriber's home location register HLR is presented in FIG. 6. A copy of the information presented is stored in the visitor location register of the subscriber. The key to the record is the International Mobile Subscriber Identity of the mobile subscriber. Subscriber identity is associated with a list of basic services to which the subscriber is entitled. The services are differentiated using Basic Service Group Codes BSGC. The basic services are associated with a list of closed user groups to be used with that service, the default closed user group to be used, information OA (Outgoing Access) of the allowance of calls going outside the closed user groups, and information IA (Incoming Access) of the allowance of calls coming from outside the closed user groups. In this record, the closed user groups are specified using subscriber specific codes CUG INDEX. The default closed user group is the group that will be used in establishing a call unless the calling subscriber manually enters the CUG INDEX of another group to be used in the call establishment procedure. In the example of the figure, the subscriber has been specified as belonging to user groups 1 and 2 when using the normal telephony service T11. The default CUG INDEX is 1, and the subscriber has both incoming and outgoing access. When using automatic facsimile service T62, the subscriber belongs only to user group 1, which is also the default closed user group, and has both incoming and outgoing access.

In addition to the above mentioned information, the record contains information necessary to map the subscriber specific closed user group identification CUG INDEX to the identification CUG IC (CUG Interlock Code) identifying the closed user groups unambiguously within a network. Further, the call barring specifications ICB (Incoming CUG call Barring) and OCB (Outgoing CUG call Barring) are stored in it. In the example of FIG. 6, CUG INDEX 1 corresponds to CUG IC 101, and both incoming and outgoing calls within the CUG are allowed within this group. CUG INDEX 2 corresponds to CUG IC 12, and both incoming and outgoing calls within the CUG are allowed.

When establishing a call, the closed user group to be used in the call is signaled to the network element holding the CUG information of the called subscriber, e.g. his home location register HLR. Based on the CUG information of the called subscriber, the HLR checks whether the call should be established or rejected.

The exemplary embodiment of adding to the CUG information a flag DRF (Direct Routing Flag) indicating that the calls within this CUG are to be routed directly is shown in FIG. 7. According to the figure, a DRF flag is associated with both closed user groups of the subscriber indicating that calls within these closed user groups are to be routed directly.

When establishing a connection, the DRT flag is added to the routing information request SRI sent by the interrogating MSC GMSCA to the HLR of the called subscriber. An exemplary structure of the SRI message is given in FIG. 8. The message contains:

the MSISDN number MSISDN(B) of the called subscriber, the flag-OR specifying that routing information for optimal routing should be returned, identifier CUG IC(A) of the closed user group to be used in the call establishment, and the DTR flag showing that the tariff requirement for optimal routing shall be bypassed.

The DTR flag can be transferred in the extension part of the SRI message, for example, thus requiring no changes in the specified message structure. In the figure, the extension part is distinguished from the normal part of the message by using a discriminator field. The SRI message is routed to the home location register HLRB of the called subscriber.

Figure 9:
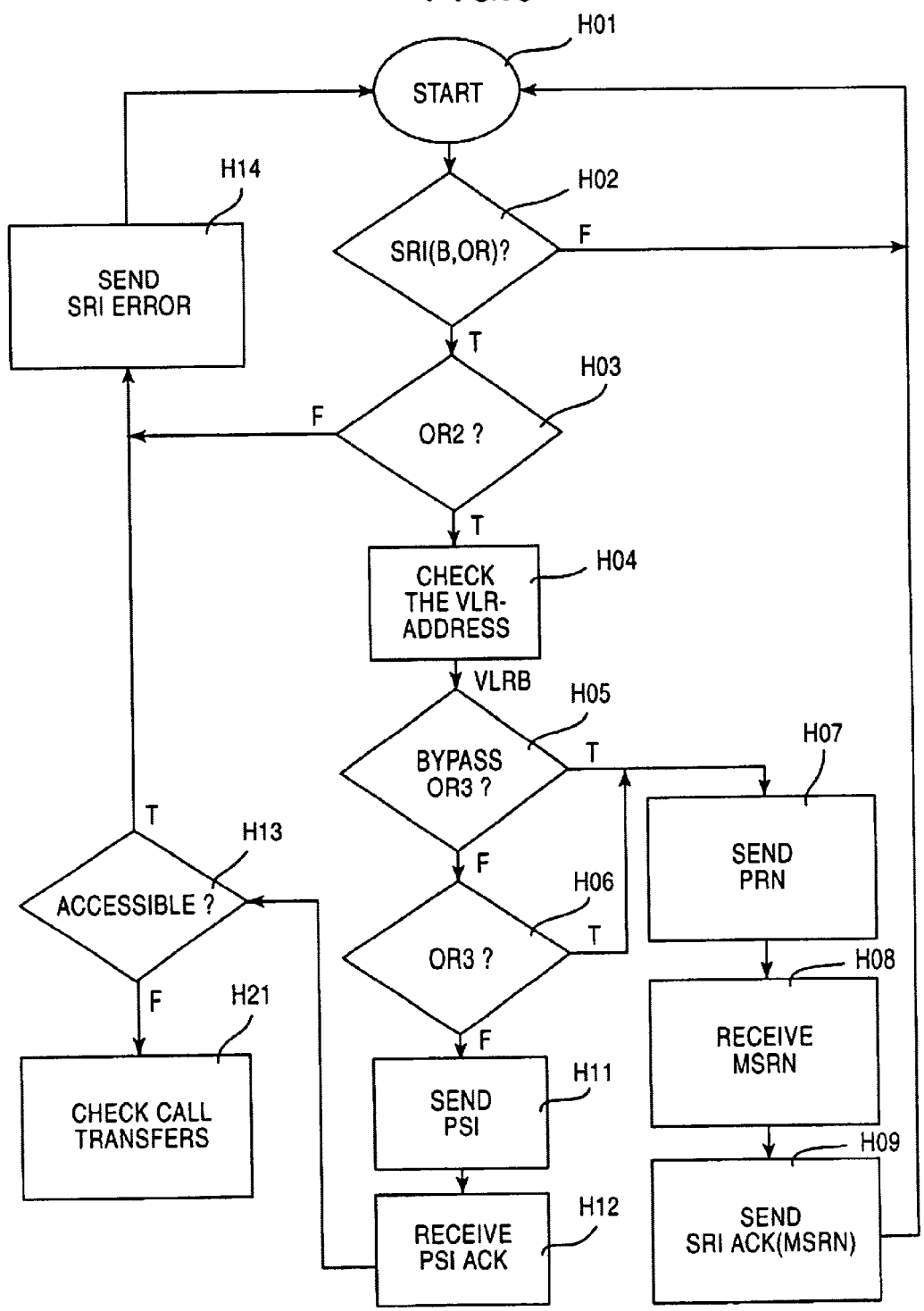
FIG. 9 shows a decision algorithm running in the HLR.

The functionality of HLRB in optimal routing is shown in FIG. 9. Having received the request SRI(B, OR) for routing information to route the call optimally (stage H02), the HLR supporting optimal routing (OR2=Yes) finds (stage H04) the VLR address of the visitor location register of the called subscriber. At stage H05 the HLR checks whether the tariff requirement OR3 should be bypassed and the call established as a directly routed call. This is done based on the subscriber information of the called subscriber and the information concerning the closed user group to be used in the call and the status of the DRF flag given in the call information received in the SRI message. If the call is to be established as a directly routed CUG call the process enters stage H07, in which the visitor location register VLRB of the called subscriber is sent a request PRN for a roaming number (stage H07). In response to the request, VLRB returns a roaming number MSRN (stage H08), which is forwarded to GMSCA (stage H09).

If the call is determined as one not to be routed as a directly routed CUG call (stage H05), the tariff requirement OR3 for optimal routing is checked (stage H06). If the requirement is met, the process advances to stage H07, in which the PSI request is sent to VLRB.

Figure 1:
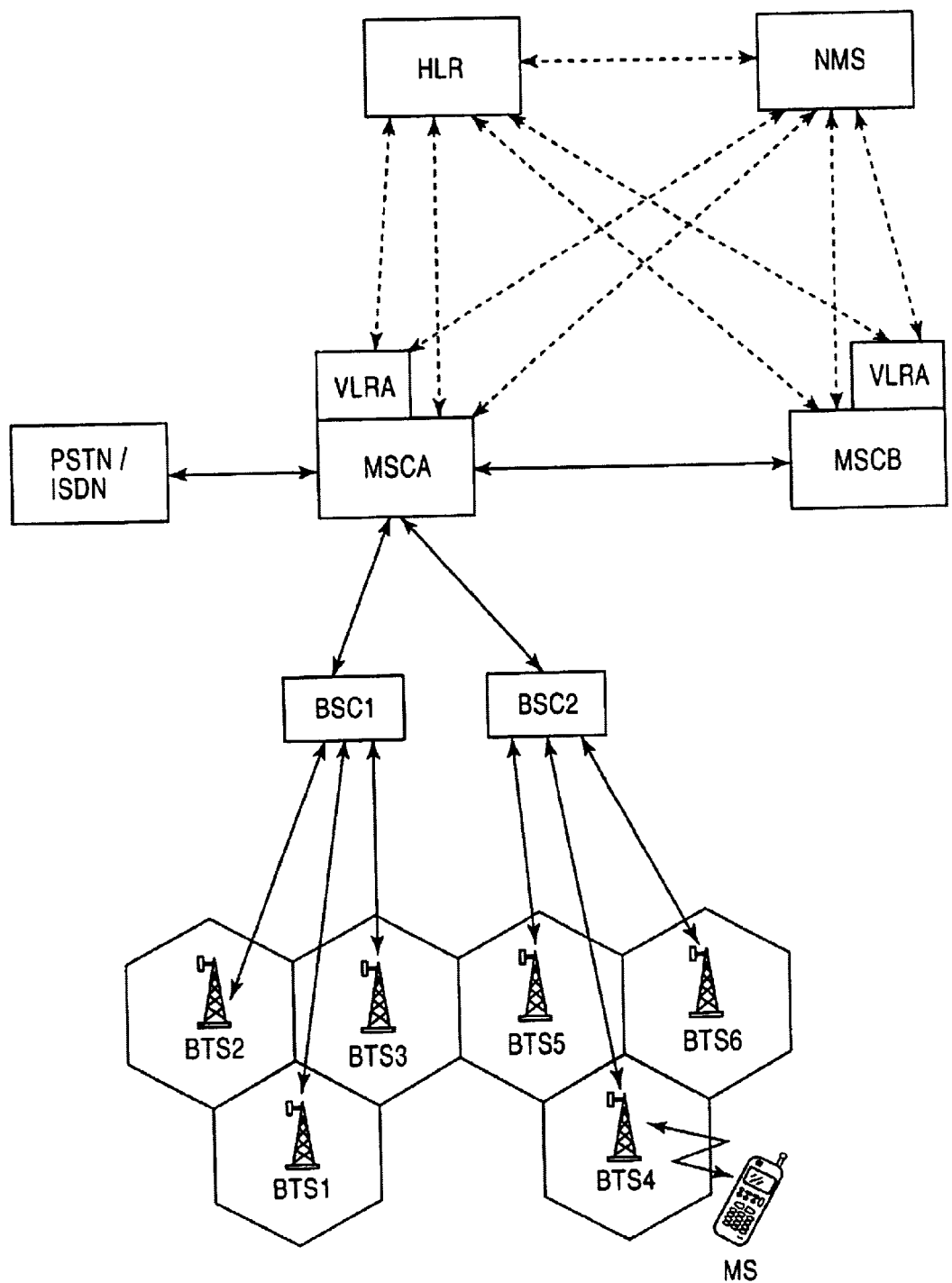
FIG. 1 shows the structure of a known mobile telecommunication network.
Figure 2:
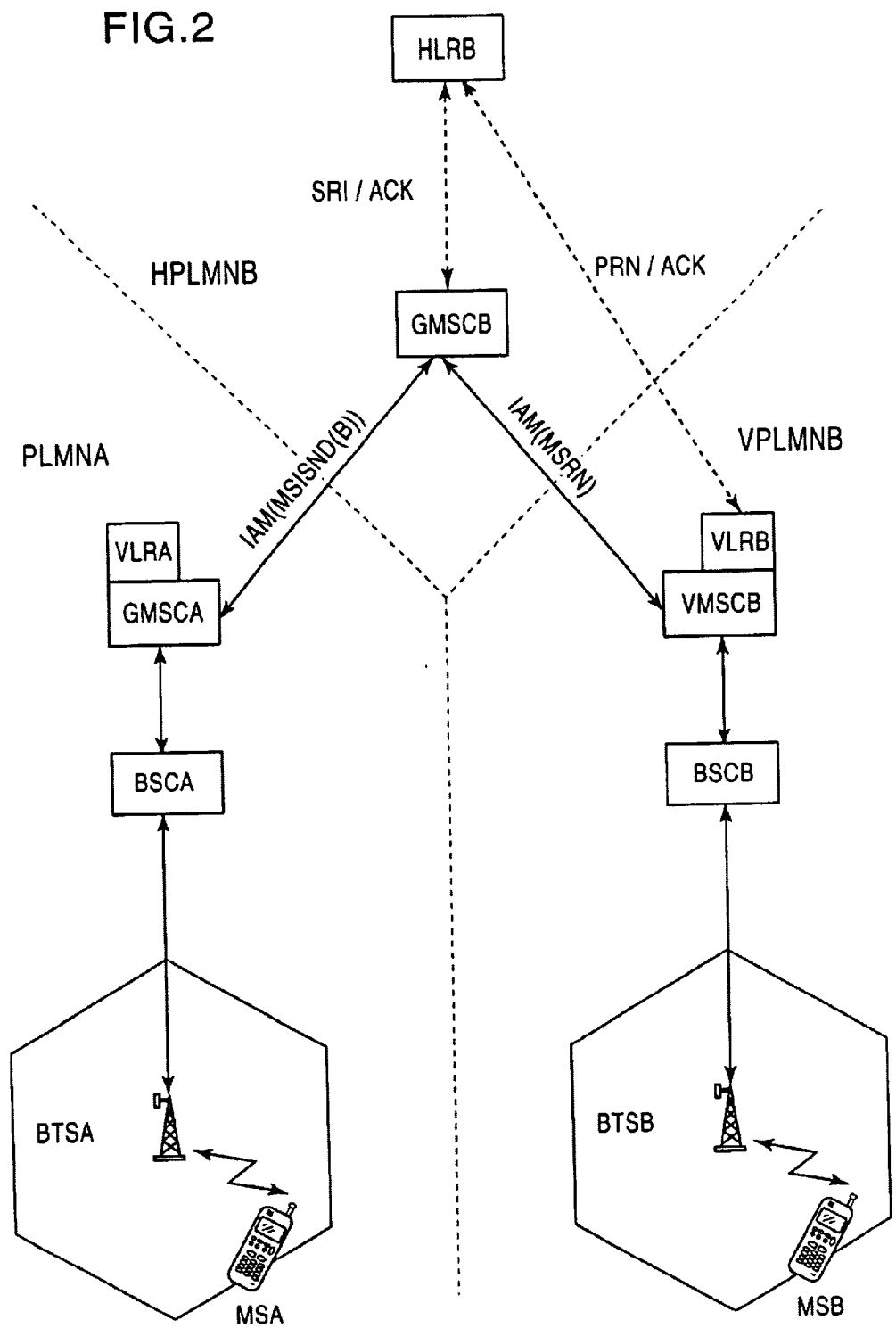
FIG. 2 shows a method of routing calls.
Figure 3:
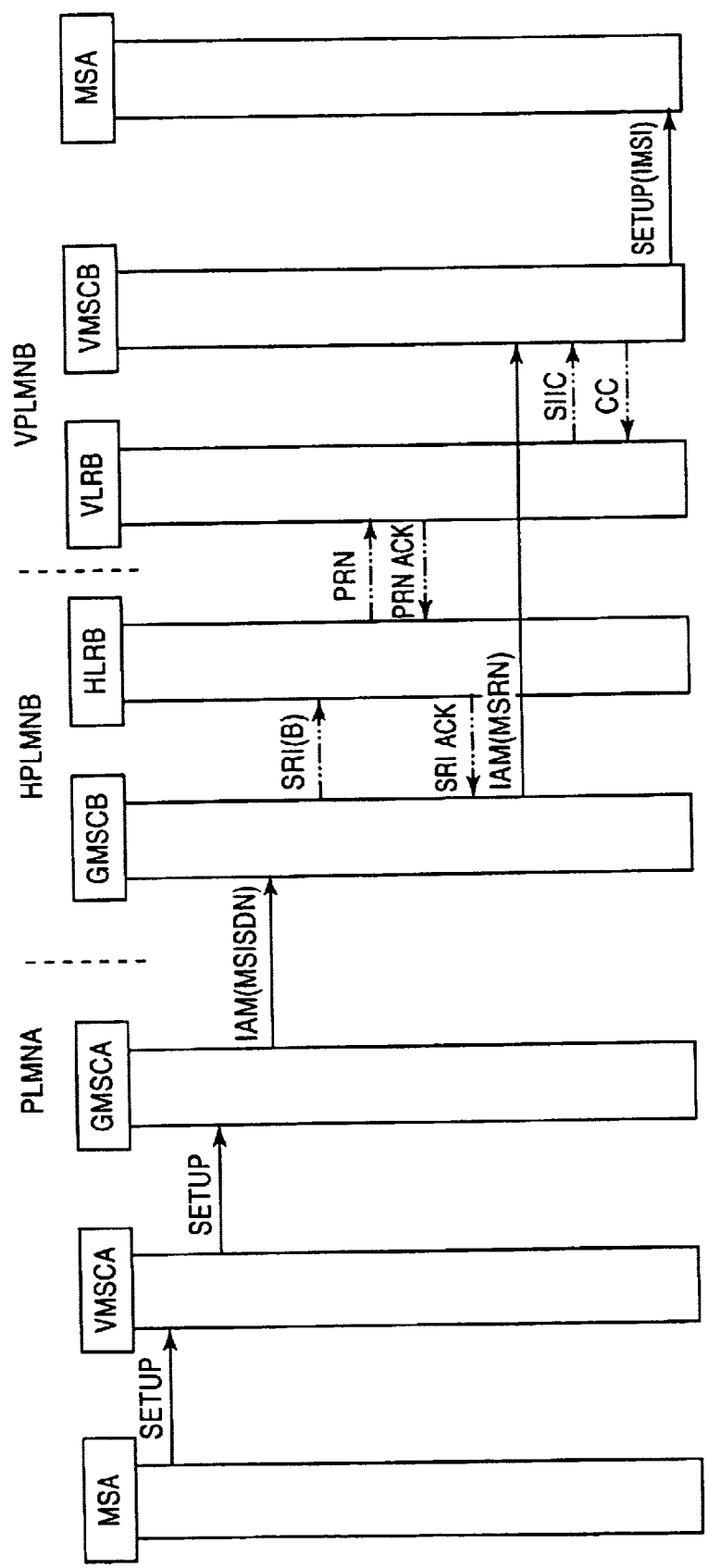
FIG. 3 shows the signaling corresponding to the above method of routing calls.
Figure 4:
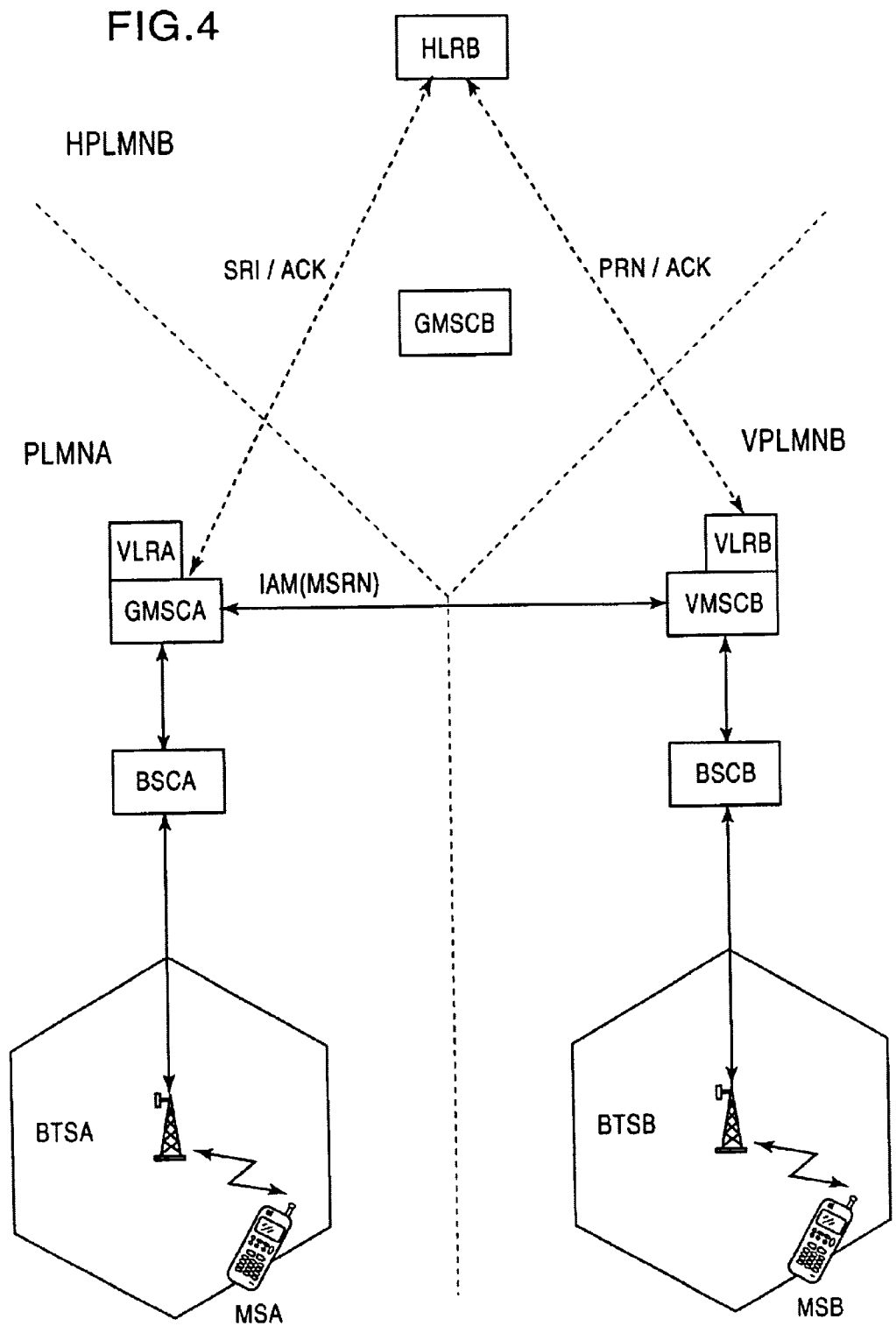
FIG. 4 shows a method of optimal routing of calls.
Figure 5:
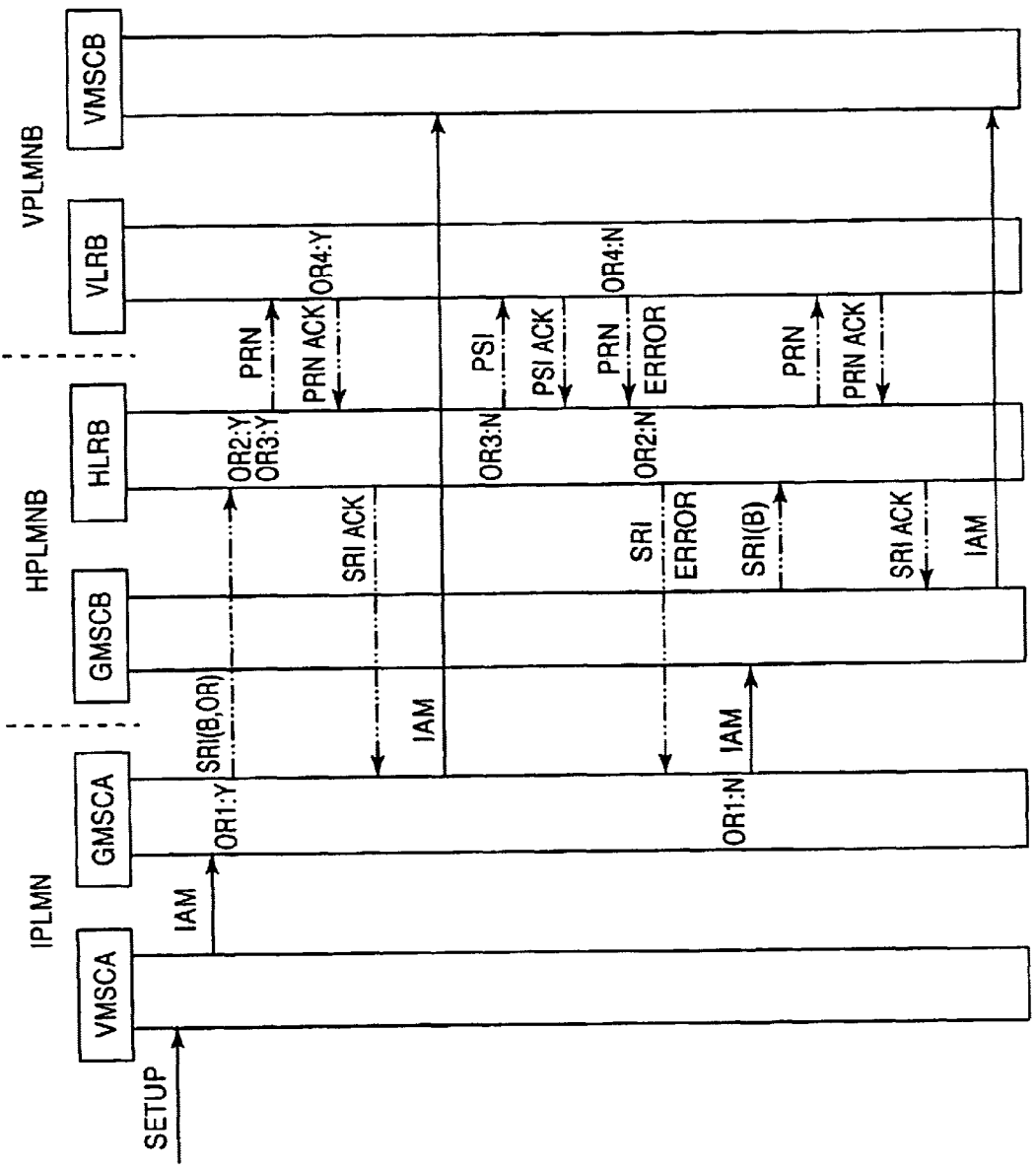
FIG. 5 shows the signaling corresponding to the optimal routing of calls.

If the HLR does not support optimal routing (OR2=No in stage H03) the GMSCA is sent a message SRI ERROR. As a response to receiving this message, the GMSCA continues the call establishment using the normal call establishment procedure shown in FIG. 3.

If the call is determined not to be a CUG call to be routed directly (stage H05) and the tariff requirement OR3 is not met (stage H06), VLRB is sent a message Provide Subscriber Information PSI (stage H11). In response to this message, VLRB returns information about the accessibility of the called subscriber (H12). If the subscriber is determined to be inaccessible, the call transfer CFNRc (Call Transfer on Not Reachable) to be carried out in this state is checked (stage H21). If the subscriber is accessible, the GMSCA is returned an error message SRI ERROR. In response to the error message GMSCA starts to establish the call as a normal call.

In addition to the checks shown in the figure, the HLR checks other data, such as the presence of the called subscriber, a change of number, unconditional call forwarding, call barring and allowance of the requested service. However, these are not essential to the invention described in this application and are therefore not shown in the figure.

Figures 10, 11:
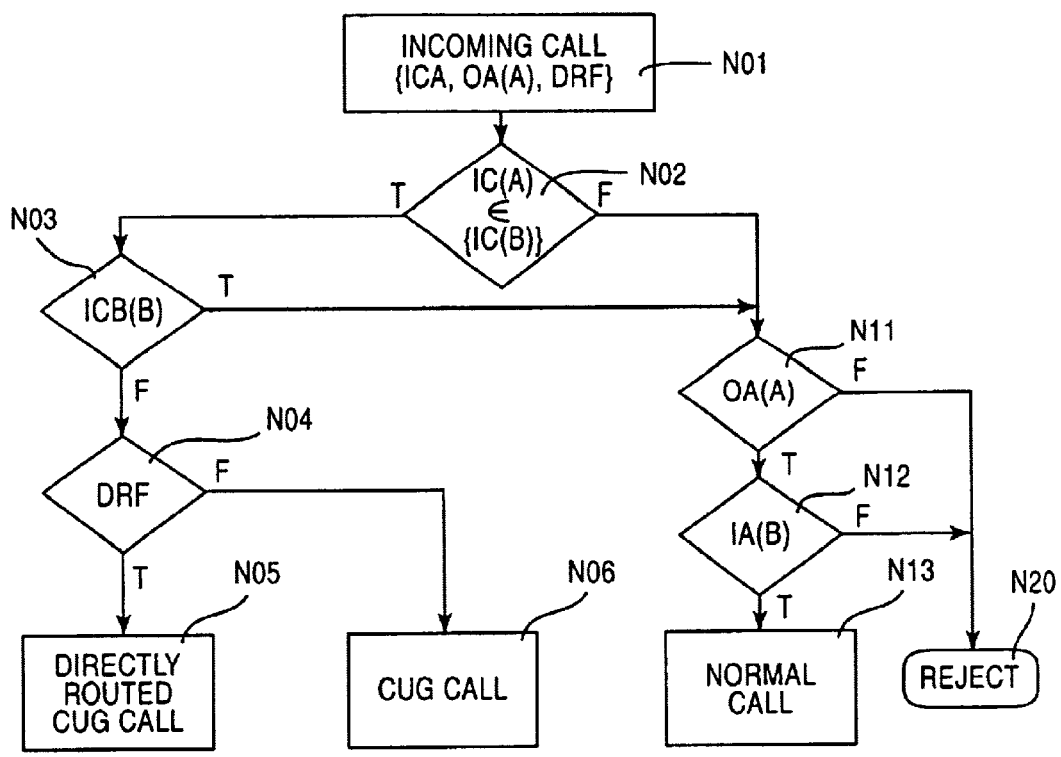
FIG. 10 shows a decision algorithm.
FIG. 11 shows record storing subscriber information.

An exemplary algorithm for checking whether the call should be established as a directly routed call by bypassing the tariff requirement at stage H05 in FIG. 9 is shown in FIG. 10. As its inputs, the algorithm takes the closed user group IC(A), the outgoing access flag OA(A), and the direct routing flag DRF given in the SRI message. Based on the subscriber information of the called subscriber, in stage N02 the algorithm checks whether the called subscriber belongs to the closed user group specified by the calling subscriber. If this condition is met (IC(A)∈{IC(B)}), i.e. if the group specified by the calling subscriber belongs to the set of closed user groups of the called subscriber, the algorithm goes to stage N03, in which a check is made as to whether the called subscriber has barred the incoming calls within the CUG (ICB(B)). If the calls are not barred (ICB(B)= False), the presence of the DRF flag in the call information is checked. If the flag is present (DRF=True), the call is routed as a directly routed CUG call. If the flag is not present (DRF=False), the call establishment is continued as a CUG-call without bypassing the tariff requirement, and the procedure of FIG. 10 enters stage H06, where the tariff requirement OR3 is checked.

If the called subscriber does not belong to the closed user group specified by the calling subscriber (IC(A)∉{IC(B)} at stage N02) or if the called subscriber has barred incoming calls within the CUG (ICB(B)=True at stage N03), the algorithm enters stages N11 and N12. At these stages, the presence of the outgoing access flag OA in the call information received in the SRI message and of the incoming access flag IA in the subscriber information of the called subscriber is checked. If the call is allowed to go outside the closed user group (OA(A)=True) and the called subscriber allows calls coming outside his closed user groups (IA(B)= True), the call is established as a normal call, i.e. a non-CUG call, without bypassing the tariff requirement. If OA(A)= False or IA(B)=False, the call is rejected.

It is to be noted that it is not essential for the present invention that the closed user group supplementary service as specified by GSM 02.85 is used. The check whether the calling and the called subscribers belong to the same closed user group requiring direct routing of calls within the user group can be performed with other implementations, e.g. using virtual private networks specified in a system utilizing an intelligent network (IN). In the case of GSM, for example, the MSC could check whether both parties belong to the same user group using the CAMEL (Customised Applications for Mobile network Enhanced Logic) service being currently specified by ETSI.

In the IN, the exchange MSCA of the calling subscriber receives a request to establish a call. The exchange identifies the call to be established by using the IN and sends the Service Control Point SCP a query for instructions. Based on the subscriber information of the calling subscriber and the identity of the called subscriber, the SCP checks whether the call should be routed directly. If this is the case, the SCP returns to the MSC the information that the call is to be routed directly, and the MSC adds a flag indicating to the HLR of the called subscriber that the call is to be routed directly. In response, the HLR returns the routing information for the direct route.

As an alternative, the SCP can send directly to the HLR a request for routing the call directly. This gives advantages, e.g., in situations where the SCP is implemented in the same computer as the HLR. In this case, the MSC sends the HLR a normal request SRI for routing information, but the HLR returns routing information for routing the call directly, based on the instructions the HLR has received from the SCP.

In another embodiment of the invention, a subscriber can specify that all the calls placed by him are to be routed directly. On the average, especially in the first phase of optimal routing, the price of his calls is then at the same level as it would have been when using normal routing. For the other party, however, the price is at the maximum on the level of a national call to a mobile subscriber.

The subscriber can determine that all his calls are to be routed directly by including, for example, a Systematic Direct Routing Flag SDRF shown in FIG. 11 into his subscriber information. In the figure, the true value of the SDRF flag is given for every basic service group code BSGC. The subscriber has indicated that all his voice calls (BSGC T11) are to be routed directly. In the example shown in the figure, the subscriber has also specified that his CUG calls are to be routed directly. However, since the SDRF flag is present, also calls going outside his closed user groups are routed directly.

Figures 12, 13, 14:
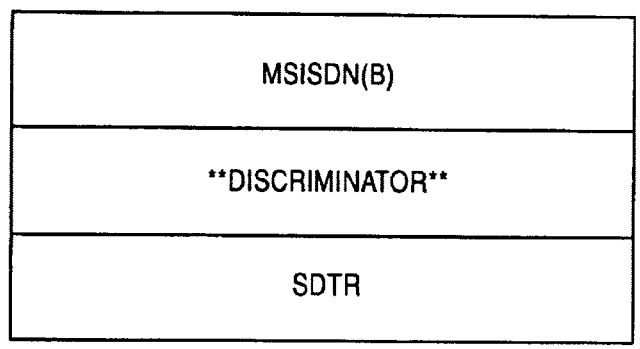
FIG. 12 shows the structure of a message.
FIGS. 13 and 14 show records storing subscriber information.

In the call setup procedure, the value of the SDRF flag is signaled to the home location register of the called subscriber preferably in the routing information request SRI. The minimum set of fields needed in the SRI message is shown in FIG. 12. The message contains the MSISDN number MSISDN(B) of the called subscriber and the SDTR flag indicating that the tariff requirement for optimal routing is to be bypassed. The SDTR flag can, e.g., be transferred in the extension part of the SRI message, thus requiring no changes in the specified message structure. To allow directly routed CUG calls as well, the fields shown in FIG. 8 must also be included in the SRI message.

The SRI message is routed to the home location register of the called subscriber, which follows a decision procedure as shown in FIG. 9. At stage H05 in FIG. 9, the presence of the SDRF flag is checked. If the flag is present, the procedure enters stage H07 directly, when VLRB is sent a PRN message. If the flag is not present and there are no other reasons for bypassing the tariff requirement OR3, a tariff requirement check is made (stage H06).

In the next embodiment to be studied, the called subscriber specifies that calls destined to him are to be routed directly. It can be specified that in this case, unlike all the other cases, the called subscriber is billed for the whole call unless also the calling subscriber has requested that the call is to be routed directly (DRF=True or SDRF=True).

The called subscriber can specify that his calls are to be routed directly by specifying in his subscriber information a positive truth value for Direct Routing for Incoming Calls Flag DRICF. This specification is needed in the HLR only. FIG. 13 shows a record storing subscriber information in the HLR. In the example shown in the figure, the subscriber has specified that all the incoming calls are to be routed directly. When receiving a request SRI for routing information, the HLR runs the decision procedure shown in FIG. 9. At stage H05 the HLR checks the presence of the DRICF flag in the subscriber information of the called subscriber. If the flag is present, the tariff requirement OR3 is bypassed, and the procedure enters stage H07 directly, when the visitor location register VLRB of the called subscriber is sent a request PSI for a roaming number. If the DRICF flag is not found to be present, the tariff requirement OR3 is checked (stage H06).

As an alternative embodiment, the subscriber can specify that all the incoming calls within a closed user group are to be routed directly. A subscriber information record according to this embodiment is shown in FIG. 14. When receiving a request SRI for routing information, the HLR follows the decision procedure shown in FIG. 9. If the incoming call is a CUG call and the called subscriber belongs to the specified CUG, at stage H05 the HLR checks the presence of the DRICF flag in the subscriber information concerning that CUG of the called subscriber. If the flag is present, the tariff requirement OR3 is bypassed and stage H07 is entered immediately, when the visitor location register VLRB of the called subscriber is sent a request for routing number. If the DRICF flag is not found to be present, the tariff requirement OR3 is checked (stage H06).

In yet another embodiment, the calling subscriber can specify manually on a call per call basis that his call is to be routed directly. In this embodiment, the subscriber specifies in the call setup phase that the call is to be routed directly even if the tariff requirement is not fulfilled. This embodiment is particularly useful when, for example, the calling subscriber knows the location of the called person, the home PLMN of the called subscriber is on the other side of the globe, and the probability is low that the called subscriber is in a even more expensive place to call, the called subscriber has specified that his her incoming calls are to be barred when roaming (BIC-Roam, Barring of Incoming Calls when Roaming), or the calling subscriber wants to decrease the bill paid by the called subscriber.

For the HLR of the called subscriber, the call establishment procedure for a call manually specified to be routed directly is similar to the procedure used when the calling subscriber has specified that all his calls are to be routed directly. When receiving a request SRI for routing information for a call manually specified to be routed directly, the HLR again runs the decision procedure shown in FIG. 9. At stage H05 the HLR checks the presence of the DRF flag in the call information received with the SRI message. If the flag is present, the tariff requirement OR3 is bypassed, and the procedure enters stage H07 directly, when the visitor location register VLRB of the called subscriber is sent a request PSI for a roaming number. If the DRICF flag is not found to be present, the tariff requirement OR3 is checked (stage H06).

In the example of FIG. 9, unconditional direct routing is achieved by bypassing the tariff requirement OR3 for optimal routing. It is obvious, however, that the invention can be carried out by checking first the condition OR3 for optimal routing. If the condition is met, the call is routed directly. If the condition OR3 is not met, the presence of the direct routing flag is checked. If the flag is present, the call is routed directly, and if the flag is not present, the call is routed using normal routing.

The invention makes it possible to use the most direct and thus the cheapest route for the call even if the tariff requirement for optimal routing is not met. Thus subscribers that can themselves come to an agreement concerning the bills can minimize the sum of their bills. This is preferable, for example, for companies that pay the mobile telephone bills of their employees and are thus only interested in the sum of the bills to be paid.

In the examples presented above, the invention is applied to the GSM system. However, it must be understood that the invention can be applied to any mobile communication system supporting direct routing.

What is claimed is:

1. A method of routing calls in a mobile telecommunication network comprising mobile stations and mobile switching centers, in which network connections can be established between the mobile stations and the mobile switching centers, the mobile switching centers can establish connections with network elements outside the mobile telecommunication network, mobile subscribers can roam outside their own home network, subscriber information including the location of the mobile subscribers is maintained, and calls are routed directly from a calling mobile subscriber to a roaming mobile subscriber, using a direct route not passing through the home network of the called mobile subscriber, if a tariff requirement is met, the method comprising steps, where a call is specified to be routed directly even if the tariff requirement is not met, in the call establishment procedure, a check is made as to whether the call has been specified to be routed directly even if the tariff requirement is not met, and if the specification has been made, the call is routed directly to the called mobile subscriber.

2. A method according to claim 1, wherein calls within a closed user group comprising a plurality of subscribers are specified to be routed directly.

3. A method according to claim 2, wherein the closed user group is a closed user group according to the specification GSM 02.85.

4. A method according to claim 2, wherein the closed user group is specified in the intelligent network (IN).

5. A method according to claim 2, wherein the demand for direct routing within a closed user group is specified by adding a flag requesting direct routing within the closed user group in the closed user group information of a subscriber, said closed user group information being part of the subscriber information.

6. A method according to claim 5, wherein in the call establishment procedure the presence of the flag requesting direct routing within a closed user group in the subscriber information of the calling subscriber is checked, and the presence of the flag is signaled to the home network of the called subscriber.

7. A method according to claim 6, wherein the presence of the flag requesting direct routing within a closed user group is signaled to the home network of the called subscriber in the message for requiring routing information in the call establishment procedure.

8. A method according to claim 1, wherein incoming calls which are within a closed user group comprising a plurality of subscribers and directed to a specified subscriber are specified to be routed directly.

9. A method according to claim 8, wherein incoming calls which are within a closed user group and directed to a subscriber are specified to be routed directly by adding a flag requesting direct routing for incoming calls within the closed user group to the closed user group information of the specified subscriber, said closed user group information being part of the subscriber information.

10. A method according to claim 1, wherein all calls made by a subscriber are specified to be routed directly.

11. A method according to claim 10, wherein all calls made by the subscriber are specified to be routed directly by adding to the subscriber information of the subscriber a systematic direct routing flag.

12. A method according to claim 11, wherein the presence of the flag requesting direct routing of all calls made by the calling subscriber is signaled to the home network of the called subscriber in the message for requiring routing information in the call establishment procedure.

13. A method according to claim 1, wherein all calls directed to a subscriber are specified to be routed directly.

14. A method according to claim 13, wherein all calls directed to the subscriber are specified to be routed directly by adding to the subscriber information of the subscriber a flag for direct routing of incoming calls.

15. A method according to claim 1, wherein a call is specified to be routed directly on a call per call basis.

16. A method according to claim 15, wherein the calling subscriber specifies call to be routed directly by adding into the call setup information a direct routing flag.

17. A method according to claim 16, wherein the presence of the flag requesting direct routing of a call is signaled to the home network of the called subscriber in the message requesting routing information in the call establishment procedure.

18. A home location register for a mobile telecommunication network comprising mobile stations, mobile switching centers, and at least one home location register, in which network connections can be established between the mobile stations and the mobile switching centers, the mobile switching centers can establish connections with network elements outside the mobile telecommunication network, mobile subscribers can roam outside their own home network, subscriber information including the location of a mobile subscriber is maintained and stored in the home location register of the subscriber, when establishing a connection to a called subscriber, the mobile switching center queries the home location register of the called subscriber for roaming information, and calls are routed from a calling mobile subscriber to a roaming mobile subscriber using a direct route which need not pass through the home network of the called mobile subscriber if a tariff requirement is met, the home location register being arranged, in response to the query received, to check whether a call is specified to be routed directly even if the tariff requirement is not met, and, if the call is specified to be routed directly even if the tariff requirement is not met, to return the mobile switching center routing information for a direct route.

19. A home location register according to claim 18, wherein the checking is done based on the call information included in the query for routing information.

20. A home location register according to claim 18, wherein the checking is done based on the subscriber information of the called subscriber.

21. A mobile switching center for a mobile telecommunication network comprising mobile subscribers and their mobile stations, mobile switching centers, and at least one home location register, in which network connections can be established between the mobile stations and the mobile switching centers, the mobile switching centers can establish connections with network elements outside the mobile telecommunication network, mobile subscribers can roam outside their own home network, subscriber information including the location of a mobile subscriber is maintained and stored in the home location register of the subscriber, when establishing a connection to a called subscriber, the mobile switching center queries the home location register of the called subscriber for roaming information, and calls are routed from a calling mobile subscriber to a roaming subscriber using a direct route which need not pass through the home network of the called subscriber if a tariff requirement is met, the mobile switching center being arranged to receive a request for routing a call directly even if the tariff requirement is not met and to forward the request to the home location register of the called subscriber.

22. A mobile switching center according to claim 21, wherein the mobile switching center is adapted to receive the request from the calling subscriber.

23. A mobile switching center according to claim 21 for a system connected to an intelligent network comprising a service control point, wherein the mobile switching center is arranged to receive the request from the service control point.

24. A service control point for an intelligent network connected to a mobile telecommunication network comprising mobile stations, mobile switching centers and at least one home location register, in which network connections can be established between the mobile stations and the mobile switching centers, the mobile switching center queries the home location register of the called subscriber for roaming information when establishing a connection to a called subscriber, the mobile switching centers can establish connections with network elements outside the mobile telecommunication network, mobile subscribers can roam outside their own home network, subscriber information including knowledge of the location of a mobile subscriber is maintained, and calls are routed from a calling mobile subscriber to a roaming mobile subscriber using a direct route which need not pass through the home network of the subscriber if a tariff requirement is met, the service control point being arranged, in response to receiving a query from a mobile switching center for instructions concerning a call, to check the subscriber information of the calling subscriber to see whether the call is specified to be routed directly even if the tariff requirement is not met, and to indicate the request to the mobile switching center.

25. A service control point for an intelligent network connected to a mobile telecommunication network comprising mobile stations, mobile switching centers and at least one home location register, in which network connections can be established between the mobile stations and the mobile switching centers, the mobile switching centers can establish connections with network elements outside the mobile telecommunication network, mobile subscribers can roam outside their own home network, subscriber information including knowledge of the location of the mobile subscribers is maintained and stored in the home location register of the subscriber, when establishing a connection to a called subscriber, the mobile switching center queries the home location register of the called subscriber for roaming information, and calls are routed to from a calling mobile subscriber to a roaming mobile subscriber using a direct route which need not pass through the home network of the subscriber if a tariff requirement is met, the service control point being arranged, in response to a query for instructions concerning a call, to check the subscriber information of the calling subscriber to see whether the call is specified to be routed directly even if the tariff requirement is not met and to indicate the request to the home location register of the called subscriber.

* * * * *